(12) United States Patent
Refaat

(10) Patent No.: US 12,168,462 B2
(45) Date of Patent: *Dec. 17, 2024

(54) PREDICTING BEHAVIORS OF ROAD AGENTS USING INTERMEDIATE INTENTION SIGNALS

(71) Applicant: Waymo LLC, Mountain View, CA (US)

(72) Inventor: Khaled Refaat, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,365

(22) Filed: Jul. 31, 2023

(65) Prior Publication Data

US 2024/0025454 A1  Jan. 25, 2024

Related U.S. Application Data

(63) Continuation of application No. 17/101,842, filed on Nov. 23, 2020, now Pat. No. 11,753,041.

(51) Int. Cl.
*B60W 60/00* (2020.01)
*G01S 13/58* (2006.01)
*G01S 13/931* (2020.01)
*G01S 17/58* (2006.01)
*G01S 17/931* (2020.01)

(52) U.S. Cl.
CPC ......... *B60W 60/0027* (2020.02); *G01S 13/58* (2013.01); *G01S 13/931* (2013.01); *G01S 17/58* (2013.01); *G01S 17/931* (2020.01); *B60W 2420/408* (2024.01); *B60W 2555/00* (2020.02)

(58) Field of Classification Search
CPC ....... B60W 60/00; G01S 17/931; G01S 17/58
See application file for complete search history.

(56) References Cited

U.S. PATENT DOCUMENTS 9,120,484 B1   9/2015  Ferguson et al.
9,381,916 B1   7/2016  Zhu et al.
9,457,807 B2   10/2016 Lee et al.
(Continued)

OTHER PUBLICATIONS

Mathworld.wolfram.com [online], "Legendre Polynomial," Last updated Nov. 2019, 2020, retrieved on Dec. 10, 2020, retrieved from URL<https://mathworld.wolfram.com/LegendrePolynomial.html>, 5 pages.

(Continued)

*Primary Examiner* — Tan Q Nguyen
(74) *Attorney, Agent, or Firm* — Fish & Richardson P.C.

(57) ABSTRACT

An autonomous vehicle includes sensor subsystem(s) that output a sensor signal. A perception subsystem (i) detects an agent in a vicinity of the autonomous vehicle and (ii) generates a motion signal that describes at least one of a past motion or a present motion of the agent. An intention prediction subsystem processes the sensor signal to generate an intention signal that describes at least one intended action of the agent. A behavior prediction subsystem processes the motion signal and the intention signal to generate a behavior prediction signal that describes at least one predicted behavior of the agent. A planner subsystem processes the behavior prediction signal to plan a driving decision for the autonomous vehicle.

20 Claims, 6 Drawing Sheets

(56) References Cited

U.S. PATENT DOCUMENTS

| | | | |
|---|---|---|---|
| 9,766,626 | B1 | 9/2017 | Zhu et al. |
| 9,989,964 | B2 | 6/2018 | Berntorp et al. |
| 10,059,334 | B1 | 8/2018 | Zhu et al. |
| 10,345,815 | B2 | 7/2019 | Lv et al. |
| 10,421,453 | B1 | 9/2019 | Ferguson |
| 10,782,694 | B2 | 9/2020 | Zhang et al. |
| 10,963,462 | B2 | 3/2021 | Sun et al. |
| 2017/0031361 | A1 | 2/2017 | Olson et al. |
| 2018/0059670 | A1 | 3/2018 | Nilsson et al. |
| 2019/0049970 | A1 | 2/2019 | Djuric et al. |
| 2019/0072965 | A1 | 3/2019 | Zhang et al. |
| 2019/0113927 | A1 | 4/2019 | Englard |
| 2019/0204842 | A1 | 7/2019 | Tafti et al. |
| 2019/0266516 | A1 | 8/2019 | Olabiyi |
| 2019/0369637 | A1 | 12/2019 | Shalev-Shwartz et al. |
| 2019/0384994 | A1 | 12/2019 | Frossard et al. |
| 2020/0082248 | A1 | 3/2020 | Villegas et al. |
| 2020/0086861 | A1 | 3/2020 | McGill et al. |
| 2020/0174490 | A1 | 6/2020 | Ogale et al. |
| 2021/0063578 | A1* | 3/2021 | Wekel .................... G06F 18/25 |
| 2021/0191394 | A1* | 6/2021 | Dudley ................ G05D 1/0061 |

OTHER PUBLICATIONS

Zaheer et al., "Deep Sets," CoRR, Mar. 10, 2017, arxiv.org/abs/1703.06114, 29 pages.

* cited by examiner

PREDICTING BEHAVIORS OF ROAD AGENTS USING INTERMEDIATE INTENTION SIGNALS

CROSS-REFERENCE TO RELATED APPLICATIONS

This application is a continuation of U.S. patent application Ser. No. 17/101,842, filed Nov. 23, 2020, which is incorporated herein by reference in its entirety.

BACKGROUND

Autonomous vehicles can include onboard sensors that capture information about the environment in which the vehicle operates. Additionally, computing systems onboard the vehicle are configured to process the sensors signals to generate automated driving decisions. The driving decisions can pertain to a range of tasks, and the degree of automation can vary. For example, semi-autonomous vehicles can automate or assist a human operator with discrete driving tasks, while fully autonomous vehicles can be driven without human intervention at all. Autonomous vehicles can also monitor other, nearby road agents (e.g., other vehicles, pedestrians, or cyclists) so that safe and effective driving decisions are made that enable the autonomous vehicle to avoid collisions and comply with applicable traffic laws and regulations.

Some autonomous vehicles implement machine-learning models such as artificial neural networks to aid in processing sensor signals and developing driving decisions. Neural networks are machine-learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. The transformation operations can be characterized by values of internal parameters of the neural network. Some neural network layers have operations that are referred to as neurons. Each neuron receives one or more inputs and generates an output for receipt by another neural network layer. Often, each neuron receives inputs from other neurons, and each neuron provides an output to one or more other neurons.

SUMMARY

This specification describes systems, methods, devices, and other techniques for predicting intentions of agents in a vicinity of an autonomous vehicle. In particular, intention prediction models can be deployed in autonomous driving systems to generate predictions about an agent's intent to perform a particular action (or intentions to perform multiple actions) that may impact how the autonomous vehicle makes driving decisions and navigates in its environment.

For example, an intention prediction signal can indicate a likelihood that a nearby vehicle intends to change lanes, turn left or right at an intersection, come to a stop, or yield to oncoming traffic. For a pedestrian or cyclist, the intention signal can indicate a likelihood that the agent (e.g., the pedestrian or cyclist) intends to cross a roadway or maintain a position within a zone (e.g., a sidewalk or construction zone) adjacent or nearby the roadway. Intentions can sometimes be inferred from the context of a scene surrounding an agent. For instance, it can be inferred that a pedestrian leaning over a curb more likely intends to cross a street than a pedestrian seated on a sidewalk bench. Likewise, a cyclist standing to the side of a bike while interacting with a mobile phone may be less likely to intend to cross a street than a cyclist positioned on the bike with two hands on the handlebars and one foot on the pedal. Recognizing that information about agents' intents can improve predictions of behaviors (e.g., actions and trajectories) that the agent may imminently perform, this specification describes techniques for autonomous vehicles to predict intents of road agents, and for applying intention signals to predict near-term behaviors of road agents in a vicinity of the autonomous vehicle.

Some implementations of the subject matter disclosed herein include methods for operating an autonomous vehicle. The methods can include actions for obtaining a sensor signal that describes observations of an environment of the autonomous vehicle acquired by one or more sensor subsystems. An agent can be detected in a vicinity of the autonomous vehicle. The sensor signal can be processed with a perception subsystem to generate a motion signal that describes at least one of a past motion or a present motion of the agent. The sensor signal can also be processed with an intention prediction subsystem to generate an intention signal that describes at least one intended action of the agent. The motion signal and the intention signal can be processed with a behavior prediction subsystem to generate a behavior prediction signal that describes at least one predicted behavior of the agent. The behavior prediction signal for the agent can then be used to plan a driving decision for the autonomous vehicle.

These and other implementations can, in some cases, include one or more of the following features.

The agent can be a pedestrian or a cyclist, and the intention signal can describe an intention of the pedestrian or the cyclist to at least one of: (i) cross a roadway on which the autonomous vehicle is traveling, (ii) not cross the roadway, or (iii) roam within a defined area in proximity to the roadway.

The agent can be an automotive vehicle other than the autonomous vehicle, and the intention signal can describe an intention of the automotive vehicle to at least one of: (i) move from one lane of a roadway on which the automotive vehicle is traveling to another lane of the roadway, (ii) yield to another agent on the roadway, (iii) come to a stop on the roadway, (iv) accelerate, (v) decelerate, or (vi) make a turn onto another roadway.

The intention signal can indicate a likelihood that the agent intends to perform the at least one intended action, and the likelihood can be substantially independent of a behavior of the autonomous vehicle.

The at least one predicted behavior of the agent described by the behavior prediction signal can be contingent on a behavior of the autonomous vehicle.

The intention signal can indicate a predicted likelihood that the agent will perform the at least one intended action within a first period of time from a current time. The behavior prediction signal can relate to at least one behavior the agent will perform within a second period of time from the current time, where the first period of time is longer than the second period of time.

The one or more sensor subsystems from which the observations contained in the sensor signal were acquired can include at least one of a light detection and ranging (LIDAR) subsystem, a radio detection and ranging (RADAR) subsystem, or a camera.

The motion signal can be a first semantic signal. The method can further include processing, with the perception system, a second semantic signal that describes at least one of a past spatial relationship or a present spatial relationship of the agent with respect to an object in the environment. The behavior prediction system can generate the behavior prediction signal further based on the second semantic signal.

The motion signal can identify at least one of a current heading of the agent, a current speed of the agent, or a current acceleration of the agent.

The motion signal can further identify at least one of past headings of the agent at one or more past points in time, past speeds of the agent at the one or more past points in time, or past accelerations of the agent at the one or more past points in time.

The behavior prediction system can be a first of a plurality of behavior prediction systems and the behavior prediction signal is a first behavior prediction signal. The actions can further include processing the intention signal with each of the plurality of behavior prediction systems to generate a plurality of behavior prediction signals.

At least some of the plurality of behavior prediction signals can describe different predicted behaviors of the agent.

At least some of the plurality of behavior prediction signals can describe predicted behaviors of different detected agents in the vicinity of the autonomous vehicle.

The behavior prediction signal can describe (i) a predicted trajectory for a short-term action of the agent and (ii) a likelihood of the agent performing the short-term action or traveling according to the predicted trajectory.

The perception subsystem, the intention prediction subsystem, and the behavior prediction subsystem are implemented separately from each other onboard the autonomous vehicle. Alternatively, the perception subsystem and intention prediction subsystem are integrated and the behavior prediction subsystem is separately implemented. The behavior prediction subsystem can generate the behavior prediction signal without processing the sensor signal.

The actions can further include executing the driving decision to affect movement of the autonomous vehicle.

Detecting the agent in the vicinity of the autonomous vehicle can include processing the sensor signal with the perception subsystem.

The intention prediction subsystem can generate the intention signal with a first model that is more computationally demanding than a second model with which the behavior prediction system generates the behavior prediction signal.

Additional aspects of the techniques disclosed in this specification include systems having one or more processors and one or more computer-readable media encoded with instructions that, when executed by the one or more processors, cause performance of operations that include any of the methods, processes, and actions described herein. Further aspects include a system having one or more sensor subsystems configured to acquire observations about an environment of an autonomous vehicle, wherein the one or more sensor subsystems output a sensor signal that contains the observations about the environment of the autonomous vehicle; and one or more computers onboard the autonomous vehicle configured to implement: a perception subsystem that (i) detects an agent in a vicinity of the autonomous vehicle and (ii) generates a motion signal that describes at least one of a past motion or a present motion of the agent; an intention prediction subsystem that processes the sensor signal to generate an intention signal that describes at least one intended action of the agent; a behavior prediction subsystem that processes the motion signal and the intention signal to generate a behavior prediction signal that describes at least one predicted behavior of the agent; and a planner subsystem that processes the behavior prediction signal to plan a driving decision for the autonomous vehicle.

Some implementations of the techniques disclosed herein can, in some cases, achieve one or more of the following advantages. First, by predicting agent intents, an autonomous vehicle may more accurately predict actions and trajectories for an agent in a vicinity of the autonomous vehicle that the agent is likely to perform. Second, by implementing intention prediction models separately from the behavior prediction models, the behavior prediction models can avoid processing high-resolution sensor data. The computational expense of predicting agent behaviors (e.g., actions and trajectories) can thus be reduced, and latency can also be reduced thereby making behavior predictions available to a planning subsystem sooner than would otherwise occur. Third, by implementing intention prediction models separately from perception models, the complexity of training and re-training perception models can be reduced when new intentions are to be predicted. Fourth, the disclosed architectures allow the intention prediction models to be trained on auto-labeled training data thereby reducing the amount of human effort involved in developing training data and generating intention models.

Additional features and advantages are described throughout the specification, and will be apparent to persons of ordinary skill in the field based on the following description, the drawings, and the claims.

DETAILED DESCRIPTION

Figure 1:
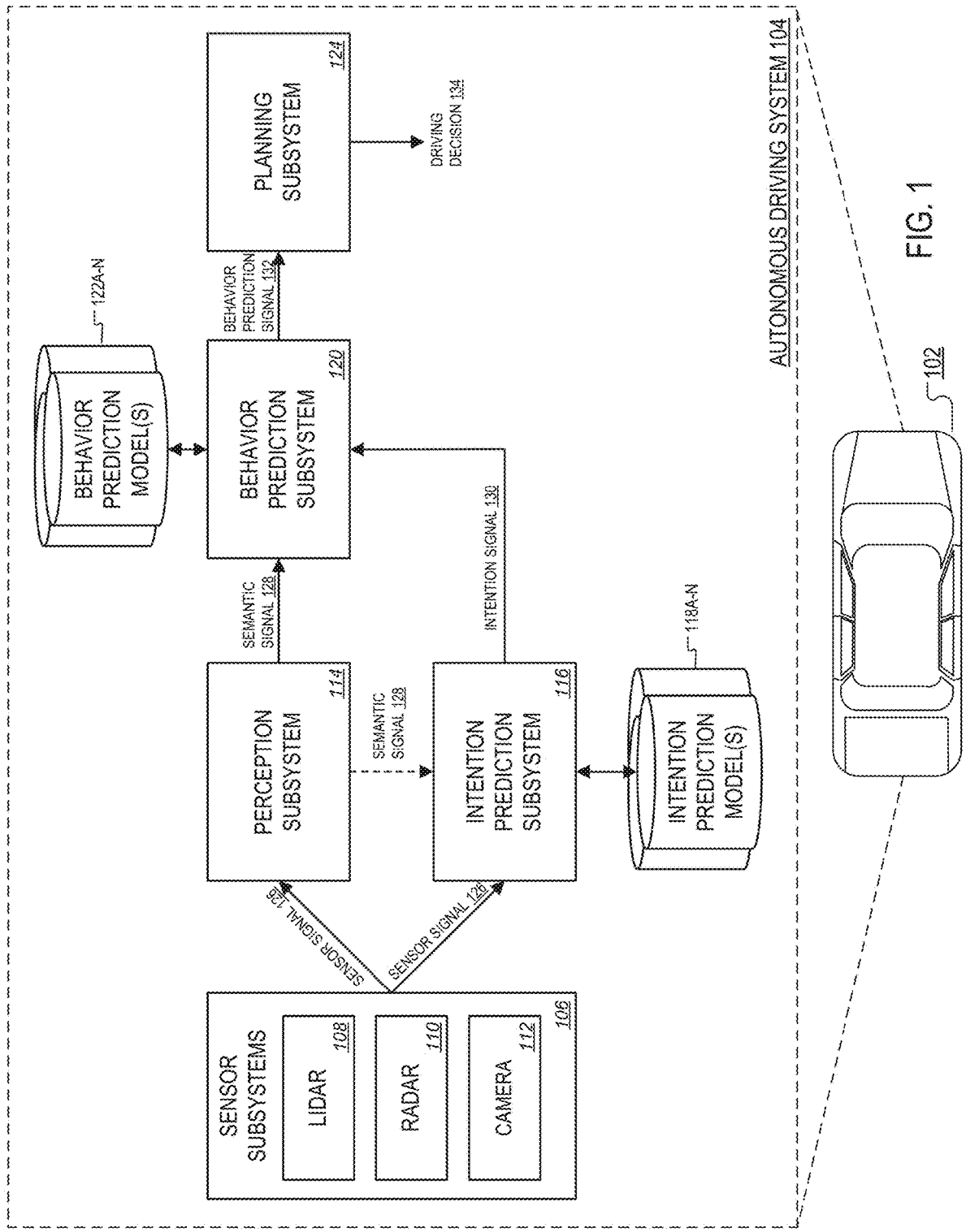
FIG. 1 is a block diagram of an on-board autonomous driving system for a self-driving car.

FIG. 1 depicts a block diagram of an on-board autonomous driving system 104 for a self-driving car 102. The self-driving car 102 is an automotive vehicle configured for operation in one or more settings such as public or private roadways. The self-driving car 102 includes autonomous driving capabilities, and can be fully autonomous (or substantially fully autonomous) such that the car 102 can perform most or all driving tasks for typical trips without a human operator or without human operation. In some implementations, the self-driving car 102 is a two-door or four-door sedan. However, any suitable vehicle can be adapted to include autonomous driving capabilities including sedans, small trucks, large trucks (e.g., lorries), mini vans, large vans, motorcycles, golf carts, station wagons, or sport utility vehicles (SUVs). In some implementations, rather than a self-driving car 102, the autonomous vehicle can be a water-based or aerial vehicle (e.g., boats or planes) configured to navigate and operate autonomously without human input. Further, the autonomous vehicle (e.g., self-driving car 102) can be a physical vehicle that exists in the real world, or can be a virtual vehicle that operates in a virtual environment such as for simulation purposes.

The autonomous driving system 104 generally encompasses a full complement of sensors and computing systems that enable autonomous driving capabilities on the self-driving car 102. The system 104 can include one or more sensor subsystems 106, a perception subsystem 114, an intention prediction subsystem 116 (with associated intention prediction models 118a-n), a behavior prediction subsystem 120 (with associated behavior prediction models 122a-n), and a planning subsystem 124. Subsystems 106, 114, 116, 120, and 124 can be implemented on one or more computers on the self-driving car 102, and can include various types of memories and data processing apparatus (e.g., CPUs, GPUs, ASICs, FPGAs, micro-controllers). The system 104 should include sufficient computing resources to enable (near) real-time monitoring of the environment surrounding the self-driving car 102, and (near) real-time processing of information about the environment such that driving decisions can be made in sufficient time to account for and react to live/changing conditions in the environment that affect the trajectory the self-driving car 102.

Sensor subsystems 106 can include one or more sensors configured to sense and acquire observations of the environment of the self-driving car 102. The sensor subsystems 106 allow the self-driving car 102 to "see" the environment in the vicinity of the vehicle 102. Some sensors are configured to emit and detect reflections of electromagnetic radiation from the environment in the vicinity of the vehicle 102. For example, the sensor subsystems 106 can include one or more laser sensors 108 (e.g., LIDAR laser sensors) configured to detect reflections of laser light. As another example, sensor subsystems 106 can include one or more radar sensors 110 configured to detect reflections of radio waves. As another example, sensor subsystems 106 can include one or more camera sensors 112 configured to detect reflections of visible light.

The sensor subsystems 106 can continually (e.g., at each of multiple time points) capture raw sensor data indicating the directions, intensities, and distances travelled by reflected radiation. For example, a LIDAR or radar sensor can transmit one or more pulses of electromagnetic radiation in a particular direction and can measure the intensity of any reflections as well as the time that the reflection was received. A distance can be computed by determining the time elapsed between transmitting a pulse and receiving its reflection. Each sensor can continually sweep a particular space in angle, azimuth, or both. Sweeping in azimuth, for example, can allow a sensor to detect multiple objects along the same line of sight. Cameras 112 can also continually capture images showing views of the environment surrounding self-driving car 102.

The sensor subsystems 106 can also continually (e.g., at each of multiple time points) generate and output a new sensor signal 126. The sensor signal 126 can include the observations of the environment captured by all or some of the sensors in the sensor subsystems 106. In some implementations, sensor signal 126 contains raw sensor data such as the distances measured to objects based on reflected laser or radio waves, or images captured by cameras 112. In some implementations, the sensor subsystems 106 are configured to project the raw sensor data into a two-dimensional view (e.g., a projected image) that shows LIDAR and/or laser results in a top-down view of the environment surrounding the self-driving car 102 (typically the self-driving car 102 is located at the center of the projected image). The sensor signal 126 can include multiple channels such as a first channel depicting a projected LIDAR image, a second channel depicting a projected radar image, and a third channel depicting an image captured by camera 112.

Perception subsystem 114 is configured to process one or more sensor signals 126 and, based on the sensor signals 126, to detect objects (e.g., road agents) located in a vicinity of the self-driving car 102. For example, the perception subsystem 114 may analyze projected LIDAR images, projected radar images, and/or camera images contained in sensor signal 126 to identify other vehicles driving adjacent or nearby the self-driving car 102. Pedestrians, cyclists, and other objects can be similarly detected, e.g., using suitable object detection and image recognition algorithms. In some implementations, perception subsystem 114 is programmed to generate bounding boxes that identify the outer bounds of a detected object in the environment with a simple geometric shape (e.g., a rectangle, circle, or oval). Perception subsystem 114 can also include memory for storing sensor signals 126 from recent/past time steps, and information about objects detected at recent/past time steps. In this way, the perception subsystem 114 may track objects in the vicinity of the self-driving car 102 over a period of time.

Perception subsystem 114 can further generate semantic signals 128 for agents in the vicinity of the self-driving car 102. Semantic signals 128 generally indicate present and/or past information about detected agents at a higher level of abstraction than the information described in sensor signal 126. For example, a semantic signal 128 can indicate an object type (e.g., classification) for a detected agent (e.g., vehicle, pedestrian, cyclist), and optionally, a sub-type (e.g., sub-classification) for the detected agent such as whether a vehicle is a truck, sedan, or minivan; whether the pedestrian is a child; whether the cyclist is a child. Semantic signal 128 can include a motion signal that describes information about the position and/or motion of an agent at the present point in time, at one or more preceding points in time, or both. The motion signal, for instance, can indicate an absolute or relative spatial position of the agent, a speed/velocity of the agent, a level of acceleration or deceleration of the agent, a heading of the agent (e.g., a direction that the agent is facing/oriented toward or a direction that the agent is traveling), or a combination of all or some of these. Other semantic signals are also possible that describe current and/or recently detected behaviors of an agent, such as whether the agent recently crossed a street or made a turn. The semantic signals can also describe a spatial relationship of an agent with respect to one or more other objects shown in the scene represented by a sensor signal 126, such as whether the agent is within a threshold distance of another object (e.g., another vehicle or a personal effect of a pedestrian such as a suitcase, stroller, bag, or the like). The perception system 114 is generally not configured to predict future states or actions of agents in the environment of the self-driving car 102.

In order to safely and effectively operate self-driving car 102, the autonomous driving system 104 can benefit not just from information about past and present behaviors, but also from information about predicted behaviors that the agents are likely to perform in the future. For instance, if another vehicle traveling behind the self-driving car 102 is about to pass on the left, then the self-driving car 102 might avoid moving to the left lane for the time being. To that end, system 104 can include a behavior prediction subsystem 120 to predict behaviors of agents detected in the environment around the self-driving car 102. The predicted behaviors can be determined based on various signals including the semantic signal 128 and an intention signal 130 (described further below). In some implementations, predicted behaviors are determined further based on auxiliary signals that include additional detected information, pre-defined information, or both, about the environment of the self-driving car 102, such as road graphs and speed limit information.

Specifically, behavior prediction system 120 processes semantic signal 128 and intention signal 130 to generate a behavior prediction signal 132. The behavior prediction signal 132 can indicate various information about possible (candidate) actions that might be taken by one or more agents in the vicinity of the self-driving car 102. In some implementations, for each candidate action predicted to be performed by an agent, the behavior prediction signal 132 describes one or more candidate trajectories for the agent to travel consistent with the candidate action, and respective probability scores that indicate predicted likelihoods the agent will travel along each candidate trajectory. For example, a vehicle that approaches an intersection may have an option to continue driving straight or to make a right turn from the lane the vehicle is currently traveling in. A first action can be defined for the option of continuing to drive straight on the current road. A second action can be defined for the option of making a right turn. However, each action can be associated with, perhaps, several candidate trajectories (e.g., the right turn may be made onto either of two lanes on the new roadway, or continuing to drive straight might involve maintaining the vehicle's current speed, or might involve yielding to other traffic merging onto the lane). Trajectories can be defined in any suitable form, including images that describe the path of movement associated with the trajectory, or occupancy grids that indicate the predicted location of the agent at each of a series of evenly distributed time points for the candidate trajectory.

The behavior prediction subsystem 120 can continually update predicted behaviors for agents in the vicinity of self-driving car 120 as new signals are received from the perception subsystem 114 and intention prediction subsystem 116. The behavior prediction subsystem 120 can be configured to process in parallel and/or serially (e.g., in rapid succession) inputs to derive behavior predictions for many agents in the vicinity of the self-driving car 102. Additionally, the behavior prediction subsystem 120 can be configured to assess multiple candidate actions for all or some of the agents. In some implementations, different behavior prediction models 122a-n are defined for different actions and/or different types of agents. For instance, a first model 122a can be provided that predicts behaviors for vehicles coming to a stop, while a second model 122b can be provided that predicts behaviors for pedestrians jaywalking across a street. Models 122a-n can take any suitable form such as analytic equations, linear regression models, support vector machines, random decision forests, neural networks, or a combination of these. Due to the number of predictions that may need to be made by the behavior prediction subsystem 120 in a short amount of time, the models 122a-n may be developed to promote efficient computation of predictions for inclusion in a behavior prediction signal 132. For this reason, it can be advantageous for the behavior prediction subsystem 120 to process computed feature data from semantic signal 128, intention signal 130, and optionally additional signals, but without processing raw sensor data or other high resolution data contained in sensor signals 126 that would demand higher computational resources and potentially introduce additional latency if it were necessary for each model 122a-n to independently process sensor signals 126.

Rather than behavior prediction subsystem 120 processing sensor signals 126, system 104 provides an intention prediction subsystem 116 to process sensor signals 126 and to generate features that describe predicted intentions of agents in the vicinity of the self-driving car 102. The predictions generated by intention prediction subsystem 116 are formatted in intention signal 130, and provided as input to the behavior prediction subsystem 120. In this way, behavior prediction subsystem 120 gains the benefit of accounting for predicted intentions of the agents when predicting actual behaviors of the agents (which can improve the accuracy of behavioral predictions), but without need for the behavior prediction models to individually process sensor signals 126 (which can increase the delay required to generate a behavior prediction signal 132 needed to generate a driving decision, and can consume precious resources of the system 104).

In particular, intention signal 130 can indicate a prediction about an agent's intent to perform a particular action. Alternatively, the intention signal can indicate predictions about multiple agents' intents to perform a particular action, and/or indicate predictions about respective intents of an agent to perform different ones of multiple actions. For example, intention signal 130 can indicate a likelihood that a nearby vehicle intends to change lanes, turn left or right at an intersection, come to a stop, or yield to oncoming traffic. For a pedestrian or cyclist, the intention signal 130 can indicate a likelihood that the agent (e.g., the pedestrian or cyclist) intends to cross a roadway or maintain a position within a zone (e.g., a sidewalk or construction zone) adjacent or nearby the roadway. Intentions also do not typically change frequently, and thus once an intention signal 130 has been determined, that signal can often be re-used not just to predict multiple possible actions of an agent, but also to predict actions over multiple behavior prediction cycles. For example, the behavior prediction subsystem 120 may generate behavior predictions every 100 milliseconds, but the same intention signal 130 may be reused 5 times to facilitate behavior predictions over 5 cycles (500 milliseconds). Intention signals 130 therefore may be computed less frequently than behavior predictions signals 132, in some implementations.

Conceptually, predicted "intents" (indicated by intention signal 130) differ from predicted "behaviors" (indicated by behavior prediction signal 132) in a number of ways. The agent's intent generally indicates actions that the agent intends to perform without regard to the behavior of the self-driving car 102 (and, in some cases, without regard to the behaviors of other agents in the environment). An agent may intend to perform an action, even if the agent cannot immediately do so due to external factors. For example, a pedestrian standing on a sidewalk at an intersection may intend to cross from one side of the street to another but may not immediately perform the action if traffic is currently passing through the crosswalk. As another example, a vehicle may intend to change lanes but may be unable to do so immediately while traffic passes by in the target lane or construction barriers impede the vehicle's movement to the new lane. In some cases, an agent may intend to perform an action but never does so, e.g., if no opportunity presents itself to perform the action before new circumstances dictate a new intent. In other cases, the agent may perform an intended action only after a delayed period once conditions are ripe for the intended action to be performed. Of course, if conditions are immediately ripe, the agent in certain cases may perform the intended action immediately upon developing the intent. "Intent" predictions therefore indicate likelihoods that an agent intends to perform an action, even if the action is not immediately performed in the short-term. By contrast, "behavior" predictions indicate likelihoods that an agent will actually perform a specified action in the short-term (e.g., immediately). For example, the behavior prediction signal 132 can indicate probability scores for candidate trajectories that an agent might perform over a near-term time interval (e.g., the next 100 milliseconds, 500 milliseconds, or 1, 2, 5, 15, or 20 seconds). The intention signal 130 can indicate probability scores reflecting likelihoods that an agent intends to perform an action at any time within a longer-term time interval (e.g., within the next 10, 20, 30, 40, or 60 seconds). In some implementations, the timeframe reflected by an "intent" prediction is in the range of 5 to 30 times greater than the timeframe reflected by a "behavior" prediction. Moreover, the behavior prediction signal 132 can further differ from the intention signal 130 in that a "behavior" prediction for an agent can account for the presence and planned or predicted trajectories of the self-driving car 102. For example, the predicted trajectory of another vehicle's lane change may be influenced by the location of the self-driving car 102 relative to the other vehicle. The behavior prediction subsystem 120 can be configured to predict trajectories for the self-driving car 102 in the same or similar manner to predicting trajectories for other road agents, and the self-driving car's predicted trajectories can then be used to make dynamic predictions of the behavior (e.g., trajectories) of other agents. Intention prediction subsystem 116, by contrast, predicts agent "intents" without further information about the self-driving car's own actions (e.g., without predicted or planned trajectory information for the self-driving car).

Intention prediction subsystem 116 generates intention signal 130 based on sensor signal 126, but the intention signal 130 can further be based on semantic signal 128. For example, the semantic signal 128 can identify a type or classification of a detected agent. Subsystem 116 can then select a particular intention prediction model from a set of prediction models 118a-n that corresponds to the identified type or classification of the detected agent. The semantic signal 128 can also indicate information about the agent's past or present motions, the agent's spatial relationship to other detected objects, and/or other semantic contexts that bear on an agent's intent with respect to a particular action (e.g., whether a vehicle's turn signal is flashing, the pose of a pedestrian, a length of time that the agent has maintained a stable position). Different intention prediction models 118a-n can be trained to predict intentions for different actions, different types of agents, or both. In some implementations, the intention prediction models 118a-n are machine-learning models capable of processing formatted representations of the sensor signal 126, and optionally semantic signal 128. Generating an intention prediction can involve tracking an agent over a period of time, and thus models such as recurrent neural networks, long short-term neural networks (LSTMs), transformer networks, or the like can be employed to process the inputs and compute an intention prediction. The models 118a-n can also include convolutional layers for processing images of sensor data, for example. In some implementations, the intention prediction models 118a-n are larger (e.g., have more parameters) and more computationally demanding than behavior prediction models 122a-n.

Planning subsystem 124 is configured to receive the behavior prediction signal 132 from the behavior prediction subsystem 120, and to make driving decisions 134 based at least on the behavior prediction signal 132 for one or more agents in the vicinity of the self-driving car 102. For example, the planning subsystem 124 can select an action for the self-driving car 102, and can plot a trajectory for the self-driving car 102 consistent with the selected action. The trajectory can be optimized to maintain distance from agents in the environment, to provide a safe and comfortable ride experience for any passengers in the self-driving car 102, and to comply with applicable traffic laws and regulations. A control system (not shown) can then process the driving decisions 134 (e.g., trajectories) output by the planning subsystem 124 to actuate steering, braking, and/or acceleration of the self-driving car 102, thereby causing the self-driving car 102 to follow the planned trajectory or otherwise implement the specified driving decisions 134.

Figure 2A:
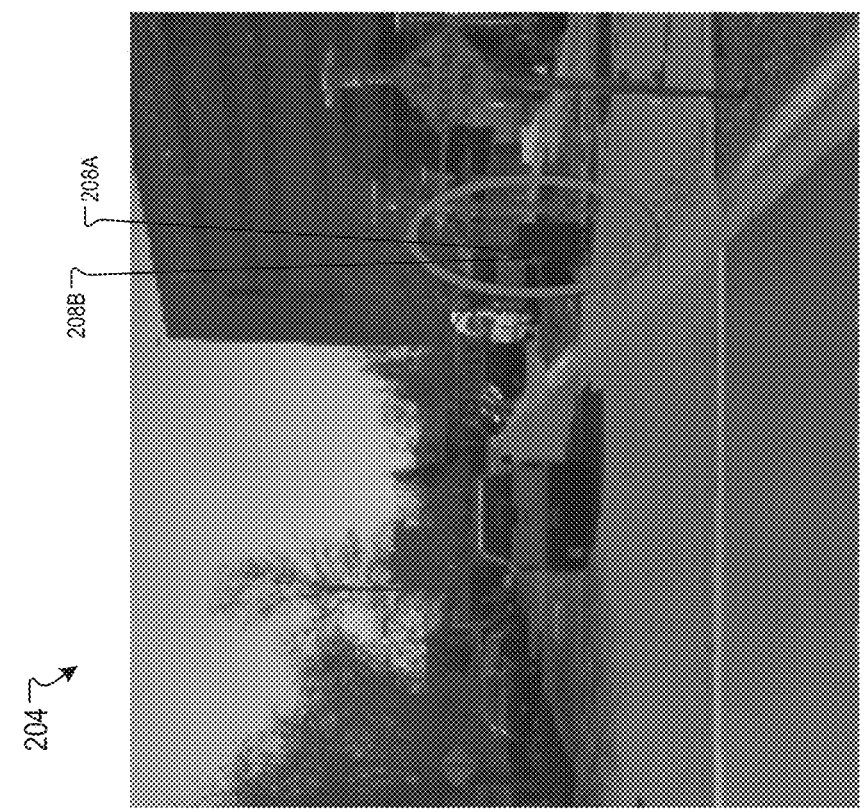
FIGS. 2A-2B show images of an environment captured by cameras onboard a self-driving car. The images respectively show a pair of pedestrians engaged in activity that provides context regarding the pedestrians' intentions to cross a roadway.
Figure 2B:
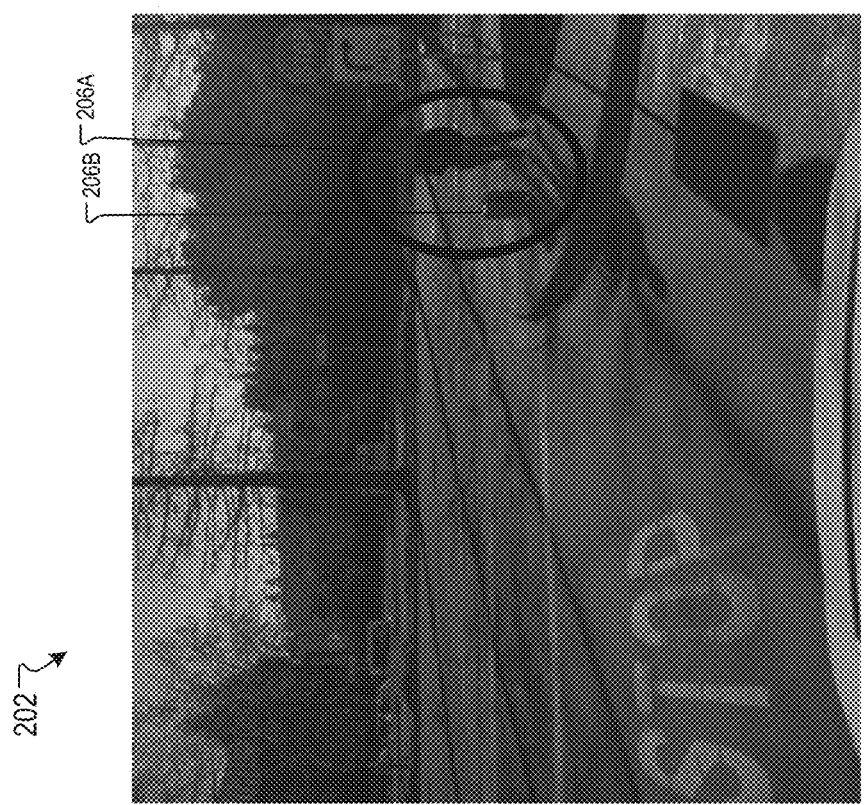

FIGS. 2A and 2B show images 202, 204 depicting respective scenes in portions of an environment in the vicinity of an autonomous vehicle. The images can be captured, for example, by a camera onboard the autonomous vehicle during a continual scan of the environment. These images demonstrate examples of how scene context can be used to predict the intent of an agent capable of moving in the path of the autonomous vehicle.

For example, in image 202, a pedestrian 206a is shown standing on a sidewalk adjacent the road. A suitcase 206b is also shown a short distance away from the pedestrian 206a. Since pedestrian 206a is not currently holding the suitcase, but is actually separated from the suitcase by a short distance, the pedestrian 206a likely does not intend to cross the road in the near term. Image 204 shows another example in which a pedestrian 208a is standing behind a food stand 208b, and likely does not intend to cross the street in the near term. Intention prediction models can be trained to discern these types of patterns in sensor data when generating an intention prediction. In some implementations, the intention prediction models can process the images (and perhaps other observations from a sensor signal) alone to determine the intent of the pedestrians or other agents. In other implementations, the intention prediction models can process the images (and perhaps other observations) along with semantic signals from a perception subsystem. The semantic signals may indicate, for example, semantic information such as the type of agent (e.g., pedestrian), type of object (e.g., suitcase or food stand), and separation distance or other spatial relationship between the agent and object.

Figure 3:
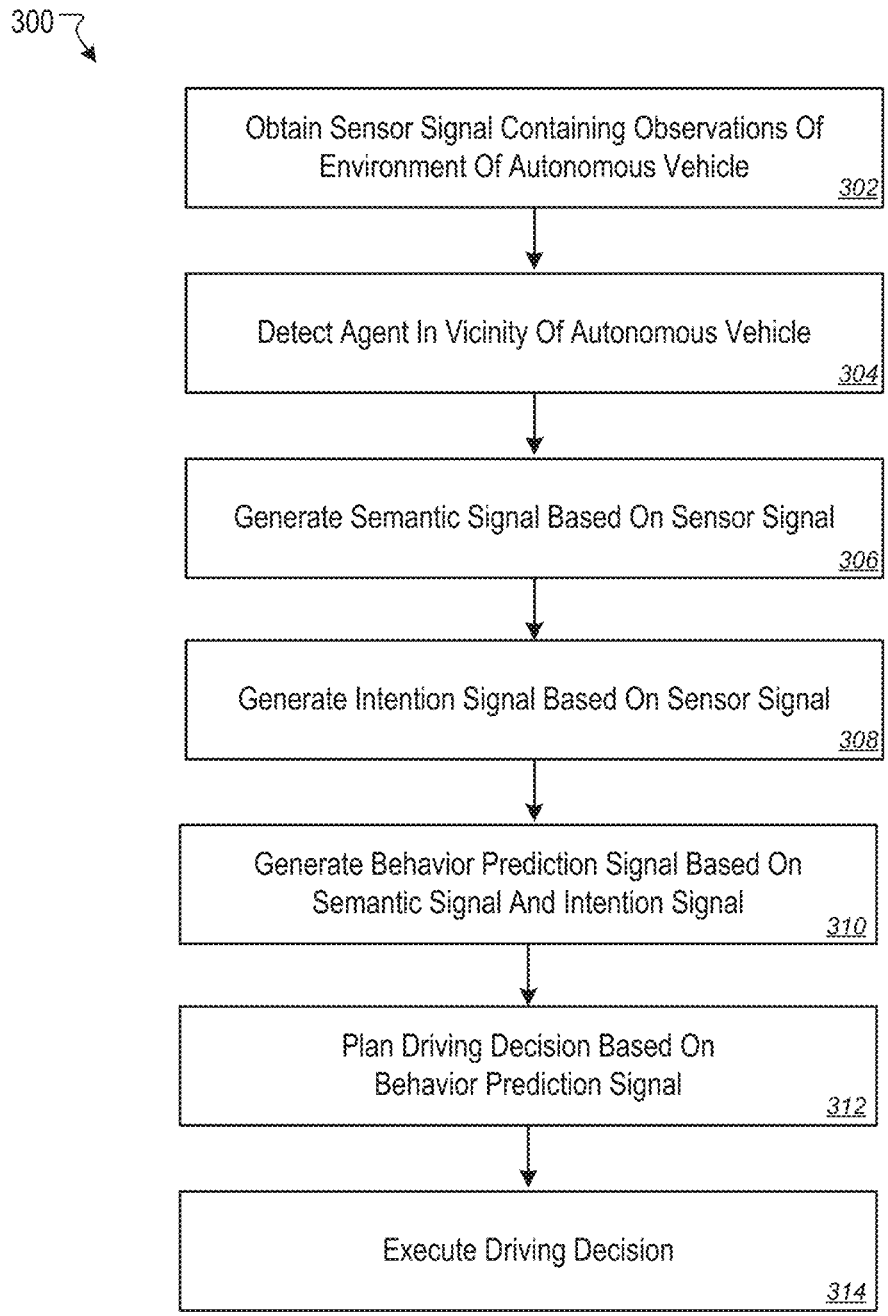
FIG. 3 is a flowchart of an example process for generating intention signals, and using the intention signals to predict short-term behaviors of agents in a vicinity of an autonomous vehicle.

FIG. 3 is a flowchart of an example process 300 for controlling an autonomous vehicle (e.g., self-driving car 102) using, among other things, intermediate intention signals for agents in the vicinity of the autonomous vehicle. The process 300 can be carried out by a system of one or more computers, e.g., onboard autonomous driving system 104.

At stage 302, the one or more sensor subsystems on the autonomous vehicle sweep the environment and capture current observations of the environment of the vehicle. The sensor subsystems can output the result of the sweep as a sensor signal that describes the information captured by one or more sensors (e.g., LIDAR, radar, and/or cameras). In some implementations, the sensor signal includes multiple channels that each correspond to an observation acquired by a different sensor. The sensor signal can include substantially full views of the environment representing a complete sweep around the autonomous vehicle, or the observations may focus on just a portion of the environment.

At stage 304, an agent can be detected in the vicinity of the autonomous vehicle. The agent can be detected, in some implementations, by a perception subsystem based on analysis of the sensor signal from the one or more sensor subsystems. For example, object detection and/or image recognition algorithms can be run to identify agents in the environment, generate bounding boxes around the agents, and classify the agent, e.g., using a hierarchical classification scheme.

At stage 306, the perception subsystem determines semantic features for the detected agent, and generates a semantic signal characterizing the determined semantic features. The semantic signal can indicate semantic features such as the type/classification for a detected agent. The semantic signal can further include a component referred to as a motion signal, where the motion signal indicates the position and/or motion of an agent at the present point in time, at one or more preceding points in time, or both. The motion signal, for instance, can indicate an absolute or relative spatial position of the agent, a speed/velocity of the agent, a level of acceleration or deceleration of the agent, a heading of the agent (e.g., a direction that the agent is facing/oriented toward or a direction that the agent is traveling), or a combination of all or some of these. Other semantic signals are also possible that describe current and/or recently detected behaviors of an agent, such as whether the agent recently crossed a street or made a turn.

At stage 308, an intention prediction subsystem generates an intention prediction signal based, for example, on the sensor signal from the one or more sensor subsystems, and optionally, on the semantic signal from the perception subsystem. The intention signal indicates a prediction about the detected agent's intent to perform a particular action, or intents to perform more than one action. The intention prediction subsystem can use models that have been trained to identify patterns or contexts in the sensor signal, as well as the semantic signal, which have predictive power with respect to a particular action. For instance, the intention prediction subsystem may determine that a pedestrian standing a few feet from his or her luggage is unlikely to cross a street in the near term, but a pedestrian holding a bag and standing at the edge of a sidewalk while gazing at a pedestrian walk sign intends to cross the street as soon as it is feasible.

At stage 310, a behavior prediction subsystem generates a behavior prediction signal for the detected agent based on the semantic signal and the intention prediction signal. The behavior prediction signal can indicate, for each of one or more candidate actions that could be taken by the agent, (i) one or more candidate trajectories that the agent is predicted to follow for the action and (ii) respective probability scores for each candidate trajectory that indicates a predicted likelihood that the agent will follow the trajectory. In general, the behavior prediction signal predicts describes predicted behavior of the agent in the vicinity of the vehicle. The predicted behavior can relate to behavior from the current point in time to a point in time near in the future, for example. Unlike the intention prediction signal, the behavior prediction signal may be contingent on past, present, or future behaviors of the autonomous vehicle itself.

At stage 312, a planning subsystem generates one or more driving decisions based at least on the behavior prediction signal from the behavior prediction subsystem. In some implementations, the planning subsystem selects an action for the autonomous vehicle and plots a trajectory consistent with the selected action. The trajectory can be optimized to maintain distance from agents in the environment, provide a safe and comfortable ride experience for passengers, and to comply with applicable traffic laws and regulations. At stage 314, a control system processes the driving decisions from the planning system and emits steering, braking, and/or acceleration instructions that prompt the autonomous vehicle to follow the planned trajectory or otherwise implement the specified driving decisions.

Figure 4:
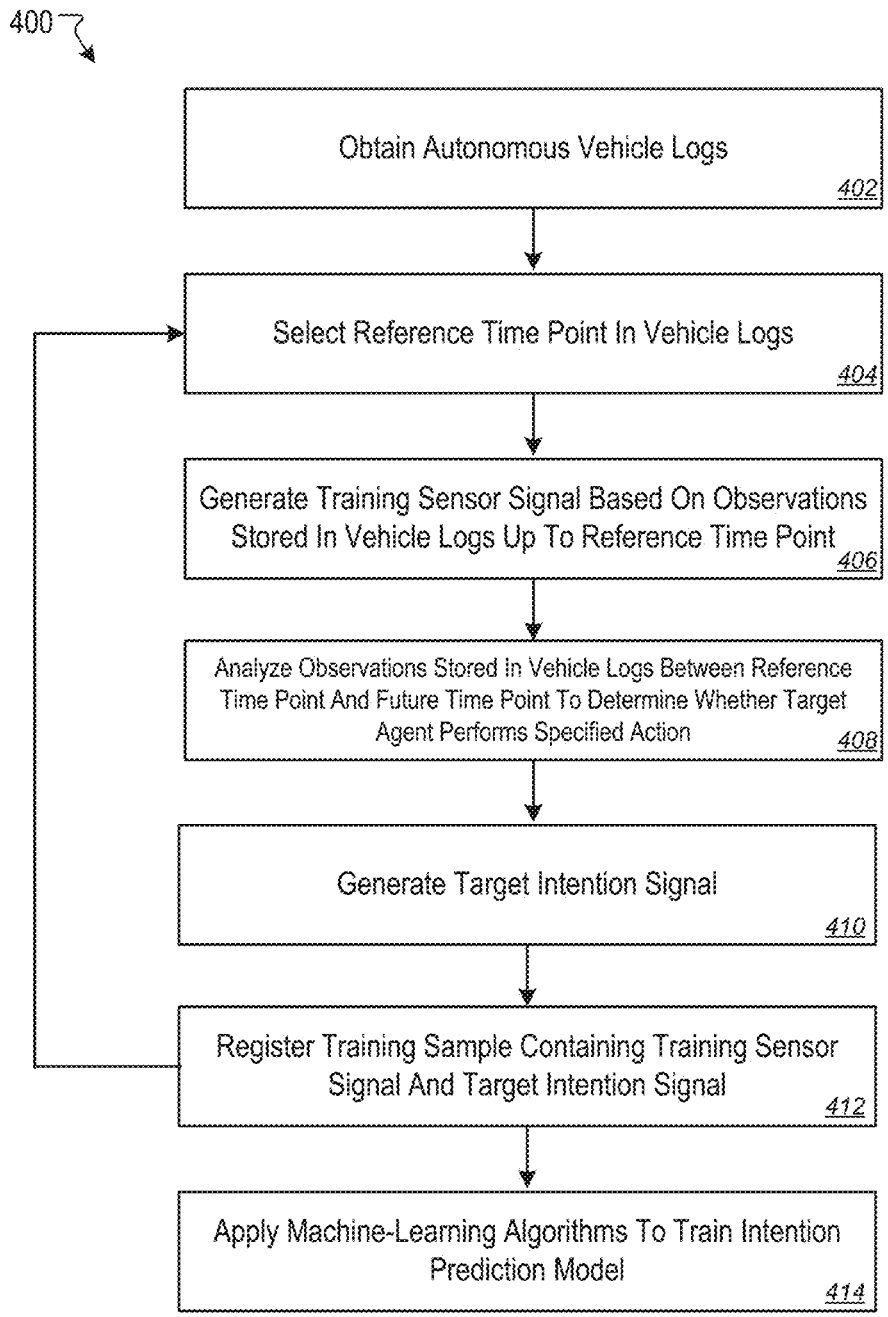
FIG. 4 is a flowchart of an example process for training an intention prediction model.

FIG. 4 depicts a flowchart of an example process 400 for training an intention prediction model using supervised machine-learning techniques. The intention prediction model can be a deep neural network, or other form of machine-learning model in these implementations. The training process 400 can be performed offline, e.g., not onboard the autonomous vehicle. In some implementations, training is performed by one or more computers in one or more locations, which may or may not include computers onboard the autonomous vehicle. If trained offline, the model's architecture and parameters (e.g., neural network weights) can be downloaded to a computing system onboard the autonomous vehicle at appropriate time(s) (e.g., pre-loaded at the factory, and/or subsequently downloaded and updated after the vehicle has been on the market).

At stage 402, the system obtains logs of sensor data (e.g., sensor signals) acquired by sensor subsystems corresponding to those found on an autonomous vehicle. For example, the logs can be obtained by storing the results of sensor sweeps performed by autonomous vehicles while driving on streets in one or more environments. The logs can contain LIDAR data, radar data, camera images, and any other observations acquired by sensors of the autonomous vehicles. The logs can also be timestamped and show the progression of views of the environment over time (e.g., video) as the autonomous vehicles drove on the streets.

At stage 404, the system selects a reference point in time in the sensor logs. The reference point in time represents a nominal "current" or "present" time from which the model will attempt to predict an intention of an agent shown in the sensor data.

At stage 406, the system generates a training sensor signal by extracting a portion of the sensor data stored in the logs from a time at or preceding the reference point up to the reference point in time. For example, the training signal can be based on the sensor data stored in the logs in the last 1, 2, 5, 10, or 15 seconds leading up to the reference point in time. The training sensor signal is formatted in a manner that can be processed by the model, e.g., as an array or tensor of floating point values representing sensor data at one or more points in time up to the reference point.

At stage 408, the system "looks ahead" in the sensor logs to determine whether the target agent (i.e., the agent of interest such as a pedestrian, cyclist, or vehicle shown in the sensor data) performs a defined action. For example, the model may be trained to predict a pedestrian's intention to jaywalk, in which case the defined action can be jaywalking. For another model, the defined action can be a lane change, or any other action relevant to different types of agents. To determine whether the target agent performs the action, the system analyzes a portion of the sensor logs from the reference point in time to a later, future point in time. The future point in time can be a defined, fixed interval after the reference point (e.g., 10, 15, 20, 25, 30, 45, or 60 seconds). In other implementations, the look-ahead interval can be varied among different training samples.

At stage 410, the system generates a target intention signal for the training sample. The target intention signal represents the ground truth that the model would ideally predict upon processing the training sensor signal. The target intention signal can be marked a first value (e.g., 'true' or '1') if the target agent performed the defined action within the applicable look ahead time interval from the reference point in time. The target intention signal can be marked a second value (e.g., 'false' or '0') if the sensor logs indicate that the target agent did not perform the defined action within the applicable look ahead time interval from the reference point in time. Appropriate criteria can be used to assess whether the agent performed the defined action. For example, the agent can be deemed to have performed the defined action if the agent completed the defined action within the look-ahead time interval or if the agent merely initiated the defined action within the look-ahead time interval. In some implementations, the sensor logs are automatically labeled and target intention signals automatically generated without need for human labeling. Automatic labeling can be performed using perception algorithms that track the behavior of the agent from the reference point in time to the later, future point in time in the logs. The generation of training data for an intention prediction model can thus be less tedious and more efficiently performed than with other approaches that require human labeling of training data.

At stage 412, the system associates the training sensor signal and the target intention signal to create a complete training sample. The operations at stages 404-412 can be repeated many times to create a collection of training samples. Different training samples can relate to different events (e.g., different pedestrians at different times intending or not intended to perform the defined action), and different reference time points can be selected for all or some of the training samples.

At stage 414, the system applies suitable supervised machine-learning algorithms to train the intention prediction model using the collection of training samples. For instance, the system can select a training sample and process the training sensor signal with the intention prediction model according to current values of the weights/parameters of the model to generate a predicted intention signal. The predicted intention signal can be compared to the target intention signal, and the error between the predicted and target intention signals can be back propagated through the model by adjusting values of the weights/parameters in the model in such a way that reduces the error (e.g., using gradient descent). This can be repeated over many training samples or batches of training samples until the model converges and a training stop condition is met. At the completion of training, the intention prediction model can be deployed for use on autonomous vehicles.

Figure 5:
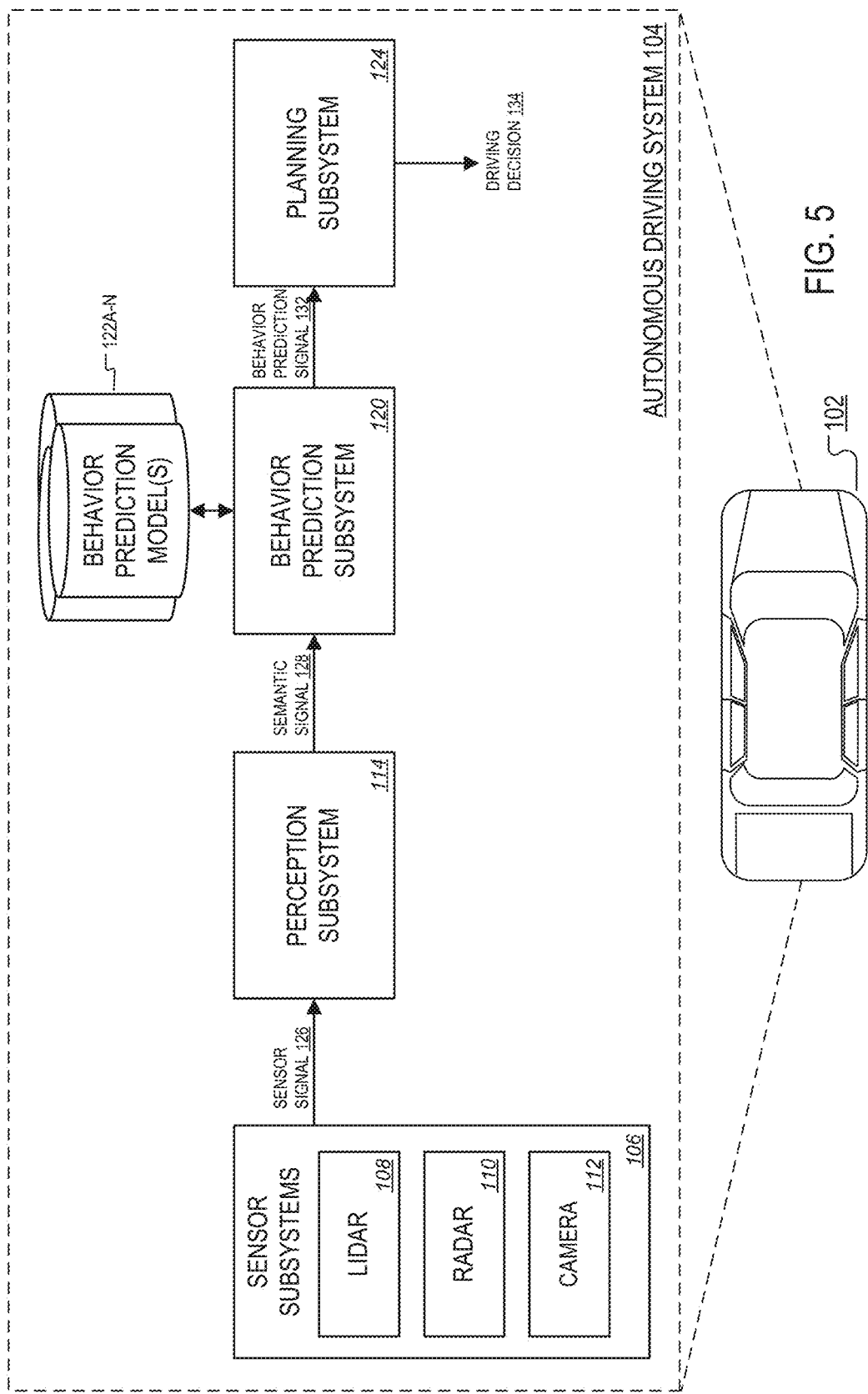
FIGS. 5-6 depict block diagrams of alternative system architectures of autonomous vehicles for planning driving decisions based on behavior prediction signals for agents in a vicinity of an autonomous vehicle.
Figure 6:
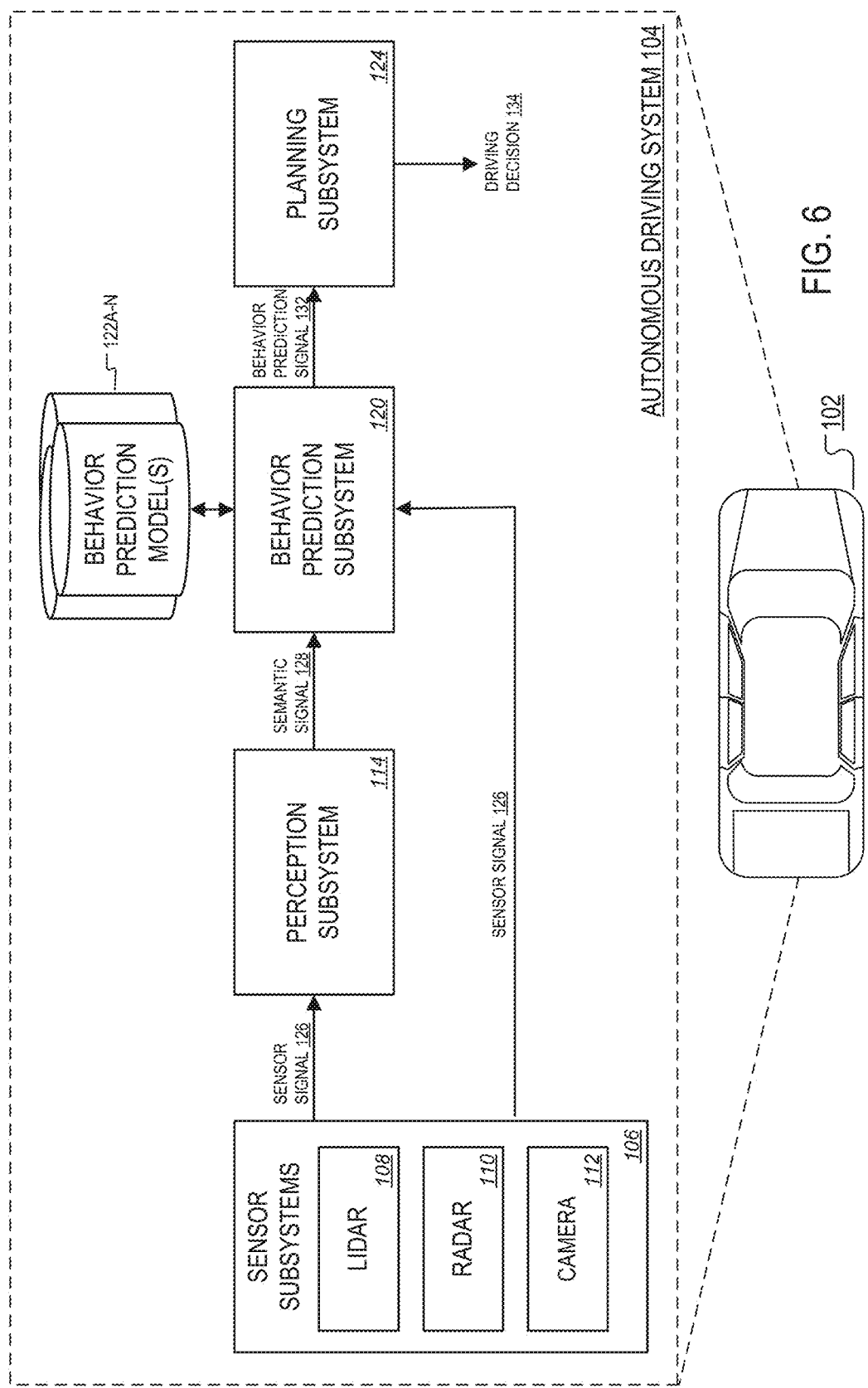

Certain advantages of the system architectures and processes described with respect to FIGS. 1-4 can be seen in comparison to approaches depicted in FIGS. 5 and 6. For example, the architecture shown in FIG. 5 lacks an intention prediction subsystem and intention prediction models. To accommodate the lack of distinct intention prediction components, the system can either generate agent behavior predictions without the benefit of intention prediction signals, or the perception models (not shown) associated with the perception subsystem can be extended to add additional semantic signals. The former option, however, will typically lead to less accurate behavior predictions, while the latter option increases complexity in the perception models and is tedious since human labeling would be required to train machine-learning models for the additional semantic signals.

The architecture shown in FIG. 6 also lacks an intention prediction subsystem and intention prediction models. But in this case, the behavior prediction subsystem 120 directly receives sensor signal 126, which in turn can be processed by all or some of the behavior prediction model(s) 122*a-n* when generating behavior predictions. This approach enables the behavior prediction subsystem models 122*a-n* to augment semantic signals 128 with automatically learned signals, but it is computationally expensive and may not be feasible to implement with typical levels of hardware on autonomous vehicles if every behavior prediction were to separately process the sensor signal 126. Due to added latency, it can be challenging to ensure behavior predictions are generated in sufficient time for the planning subsystem to generate a driving decision 134 that can be safely implemented. In contrast, intermediate generation of intention signal 130 in FIG. 1 allows the prediction models 122*a-n* to efficiently access and process additional predictive information derived from the sensor data without need for the prediction models 122*a-n* to individually process such high-resolution data provided in the sensor signal 126.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   identifying an intended action of a road agent detected by an autonomous vehicle, the intended action representing an action that the road agent would take if other agents detected in a vicinity of the road agent were disregarded;
   identifying a past movement of the road agent;
   predicting a behavior of the road agent based on the intended action of the road agent and the past movement of the road agent;
   generating a driving decision for the autonomous vehicle based on the predicted behavior of the road agent; and
   initiating a movement of the autonomous vehicle based on the driving decision.

2. The method of claim 1, wherein the road agent is a pedestrian or a cyclist, and the intended action describes an intention of the pedestrian or the cyclist to at least one of:
   (i) cross a roadway on which the autonomous vehicle is traveling,
   (ii) not cross the roadway, or
   (iii) roam within a defined area in proximity to the roadway.

3. The method of claim 1, wherein the road agent is a vehicle other than the autonomous vehicle, and the intended action describes an intention of the vehicle to at least one of:
   (i) move from one lane of a roadway on which the vehicle is traveling to another lane of the roadway,
   (ii) yield to another agent on the roadway,
   (iii) come to a stop on the roadway,
   (iv) accelerate,
   (v) decelerate, or
   (vi) make a turn onto another roadway.

4. The method of claim 1, wherein the intended action further represents a prediction of action that the road agent would take if the road agent disregarded a presence of the autonomous vehicle in the environment.

5. The method of claim 1, wherein the predicted behavior of the road agent is predicted based on a behavior of the autonomous vehicle.

6. The method of claim 1, wherein identifying the past movement of the road agent comprises identifying at least one of a past heading of the road agent at one or more past points in time, a past speed of the road agent at the one or more past points in time, or a past acceleration of the road agent at the one or more past points in time.

7. The method of claim 1, wherein the intended action of the road agent is determined by an intention prediction subsystem that is more computationally demanding than a a behavior prediction subsystem that predicts the behavior of the road agent.

8. A system, comprising:
   one or more processors; and
   one or more computer-readable media having instructions stored thereon that, when executed by the one or more processors, cause performance of operations comprising:
      identifying an intended action of a road agent detected by an autonomous vehicle, the intended action representing an action that the road agent would take if other agents detected in a vicinity of the road agent were disregarded;
      identifying a past movement of the road agent;
      predicting a behavior of the road agent based on the intended action of the road agent and the past movement of the road agent;
      generating a driving decision for the autonomous vehicle based on the predicted behavior of the road agent; and
      initiating a movement of the autonomous vehicle based on the driving decision.

9. The system of claim 8, wherein the road agent is a pedestrian or a cyclist, and the intended action describes an intention of the pedestrian or the cyclist to at least one of:
   (i) cross a roadway on which the autonomous vehicle is traveling,
   (ii) not cross the roadway, or
   (iii) roam within a defined area in proximity to the roadway.

10. The system of claim 8, wherein the road agent is a vehicle other than the autonomous vehicle, and the intended action describes an intention of the vehicle to at least one of:
    (i) move from one lane of a roadway on which the vehicle is traveling to another lane of the roadway,
    (ii) yield to another agent on the roadway,
    (iii) come to a stop on the roadway,
    (iv) accelerate,
    (v) decelerate, or
    (vi) make a turn onto another roadway.

11. The system of claim 8, wherein the intended action further represents a prediction of action that the road agent would take if the road agent disregarded a presence of the autonomous vehicle in the environment.

12. The system of claim 8, wherein the predicted behavior of the road agent is predicted based on a behavior of the autonomous vehicle.

13. The system of claim 8, wherein identifying the past movement of the road agent comprises identifying at least one of a past heading of the road agent at one or more past points in time, a past speed of the road agent at the one or more past points in time, or a past acceleration of the road agent at the one or more past points in time.

14. The system of claim 8, wherein the intended action of the road agent is determined by an intention prediction subsystem that is more computationally demanding than a behavior prediction subsystem that predicts the behavior of the road agent.

15. One or more non-transitory computer-readable media having instructions stored thereon that, when executed by one or more processors, cause performance of operations comprising:
    identifying an intended action of a road agent detected by an autonomous vehicle, the intended action representing an action that the road agent would take if other agents detected in a vicinity of the road agent were disregarded;
    identifying a past movement of the road agent;
    predicting a behavior of the road agent based on the intended action of the road agent and the past movement of the road agent;
    generating a driving decision for the autonomous vehicle based on the predicted behavior of the road agent; and
    initiating a movement of the autonomous vehicle based on the driving decision.

16. The one or more non-transitory computer-readable media of claim 15, wherein the road agent is a pedestrian or a cyclist, and the intended action describes an intention of the pedestrian or the cyclist to at least one of:
    (i) cross a roadway on which the autonomous vehicle is traveling, (ii) not cross the roadway, or
(iii) roam within a defined area in proximity to the roadway.

17. The one or more non-transitory computer-readable media of claim 15, wherein the road agent is a vehicle other than the autonomous vehicle, and the describes an intention of the vehicle to at least one of:
(i) move from one lane of a roadway on which the automotive vehicle is traveling to another lane of the roadway,
(ii) yield to another agent on the roadway,
(iii) come to a stop on the roadway,
(iv) accelerate,
(v) decelerate, or
(vi) make a turn onto another roadway.

18. The one or more non-transitory computer-readable media of claim 15, wherein the intended action further represents a prediction of action that the road agent would take if the road agent disregarded a presence of the autonomous vehicle in the environment.

19. The one or more non-transitory computer-readable media of claim 15, wherein the predicted behavior of the road agent is predicted based on a behavior of the autonomous vehicle.

20. The one or more non-transitory computer-readable media of claim 15, wherein identifying the past movement of the road agent comprises identifying at least one of a past heading of the road agent at one or more past points in time, a past speed of the road agent at the one or more past points in time, or a past acceleration of the road agent at the one or more past points in time.

* * * * *